Figures 1, 2:
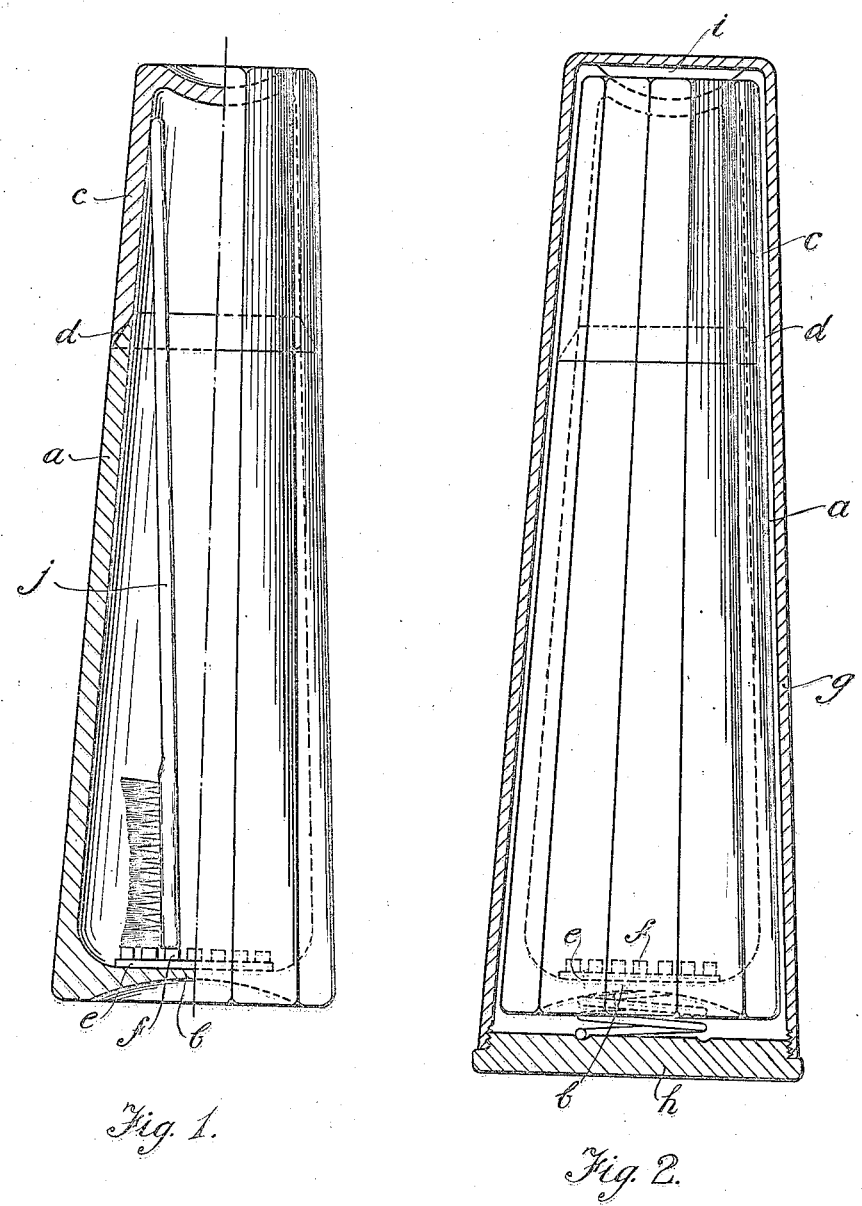

Feb. 27, 1923.

A. W. SMITH 1,446,520

RECEPTACLE FOR TOOTHBRUSHES

Filed July 3, 1922

Patented Feb. 27, 1923.

1,446,520

UNITED STATES PATENT OFFICE.

ASHLEY WETHERHEAD SMITH, OF LONDON, ENGLAND.

RECEPTACLE FOR TOOTHBRUSHES.

Application filed July 3, 1922. Serial No. 572,739.

*To all whom it may concern:*

Be it known that I, ASHLEY WETHERHEAD SMITH, a subject of the King of Great Britain and Ireland, residing at 30 Wimpole Street, London, W. 1, England, have invented a new and useful Improved Receptacle for Toothbrushes, of which the following is a specification.

This invention relates to an improved receptacle for tooth brushes, and has for its object to provide a receptacle in which brushes can be readily sterilized, and which is constructed in a portable form.

According to the invention the receptacle is formed of glass, porcelain, metal or other suitable material having a base of larger dimensions than its upper portion, such upper portion being provided with a hollow cover, cap or stopper which engages the body of the receptacle in such a manner that spilling or evaporation of the contents is prevented.

Reference will now be made to the accompanying drawings which illustrate by way of example constructions in accordance with the invention, and in which, Figure 1 is an elevation partly in section, and Figure 2 an elevation similar to Figure 1, showing the receptacle enclosed in a cover to prevent damage during transit.

The improved receptacle comprises a body portion $a$ which may be of truncated conical form as shown, or of any other convenient shape, provided that the base $b$ is of sufficient dimensions relatively to the upper portion to secure stability. The receptacle is provided with a cover $c$ and the engaging surfaces of cover and receptacle at $d$ are inclined at acute angles to the surfaces of cover and receptacle and are ground to ensure close engagement. The exterior of the receptacle and cover may be fluted as shown, or may be formed plain or in any other desired manner in accordance with taste.

It is preferred to dispose in the base of the receptacle a removable support $e$ of india-rubber, glass or other material having projections $f$ on its upper side, this pad serving to maintain the lower end of a brush out of contact with sediment which collects at the base of the receptacle. This support produces the same effect as if the brush were suspended in the receptacle.

As it is preferable that the receptacle described above should be made in glass, it is necessary to protect this during transit and accordingly an outer casing $g$ or cover as shown in Figure 2 is provided formed from wood, papier-mâché, or other suitable material, into which the receptacle is adapted to be inserted, cover first. The outer casing is provided with a detachable base $h$ provided with screw threads adapted to engage corresponding internal threads in the base of the casing $g$.

It is preferred to dispose a pad $i$ of sponge, rubber or felt within the outer casing at the end remote from its opening or instead of a pad a light spring may be employed to prevent transmission of shocks received by the casing to the receptacle. A similar arrangement may also be disposed between the base of the receptacle and the removable base $h$ of the casing, so that when the latter is secured in place no relative movement can take place between the receptacle $a$ and its outer casing. Moreover, the base $h$ being screwed in place, the pressure of the yieldable elements $i$ and $k$ press on the extreme ends of the receptacle and hold the cover $c$ in place, as will be understood.

In use the receptacle $a$ is partly filled with a desired antiseptic, and into this a tooth brush $j$ is plunged, the cover $c$ is positioned, and the whole then inserted in the casing $g$.

It is obvious that the use of the device applies to cases where it is wished to prevent dental decay, pyorrhoea, or like diseases of contagion or infection spreading, and to prevent re-infection from unsterilized brushes, and fills a want in this connection.

I claim:—

1. A receptacle for keeping tooth brushes in a sterilizing fluid, comprising a body portion of greater dimensions towards its base, a removable cover, said cover and body portion having mutually engaging inclined ground surfaces, and means for maintaining the brush ends out of contact with the bottom of said receptacle.

2. A receptacle for keeping tooth brushes in a sterilizing fluid, comprising a body portion of greater dimensions towards its base, in a sterilizing fluid, comprising a body portion having mutually engaging inclined ground surfaces, and a plate for maintaining the brush ends out of contact with the bottom of said receptacle.

In witness whereof I affix my signature.

ASHLEY WETHERHEAD SMITH.

Certificate of Correction.

It is hereby certified that in Letters Patent No. 1,446,520, granted February 27, 1923, upon the application of Ashley Wetherhead Smith, of London, England, for an improvement in "Receptacles for Toothbrushes," an error appears in the printed specification requiring correction as follows: Claim 2, line 105, strike out the words " in a sterilizing fluid, comprising a " and insert instead *a removable cover, said cover and;* and that the said Letters Patent should be read with this correction therein that the same may conform to the record of the case in the Patent Office.

Signed and sealed this 17th day of April, A. D., 1923.

[SEAL.]

KARL FENNING,
*Acting Commissioner of Patents.*